C. F. HOUGHTON.
SEMAPHORE LENS.

No. 187,631. Patented Feb. 20, 1877.

Witnesses:

Inventor:
Charles F Houghton
Per Fitch & Fitch
Attys.

UNITED STATES PATENT OFFICE.

CHARLES F. HOUGHTON, OF CORNING, NEW YORK.

IMPROVEMENT IN SEMAPHORE-LENSES.

Specification forming part of Letters Patent No. 187,631, dated February 20, 1877; application filed January 9, 1877.

*To all whom it may concern:*

Be it known that I, CHARLES F. HOUGHTON, of Corning, Steuben county, in the State of New York, have invented an Improved Semaphore-Lens, of which the following is a full, clear, and exact description, reference being had to the accompanying drawings, forming part of this specification.

My invention relates to lenses which are employed in giving signals or used upon locomotive head-lights, or other lanterns when light is to be projected to a great distance; and it has for its object the production of a more durable cheap lens, adapted to the illumination of a greater surface, and giving a broader field of illumination than is possible in lenses as now constructed; and my invention consists in a lens concavo-convex in form, and the segment of either a sphere or a spheroid, and having upon either or both of its faces a series of concentric corrugations, and thus producing a lens possessing a sufficient degree of elasticity in all directions to avoid rupture by reason of local expansion from the heat incident to the illuminating-flame, as hereinafter set forth and claimed.

Figure 2:
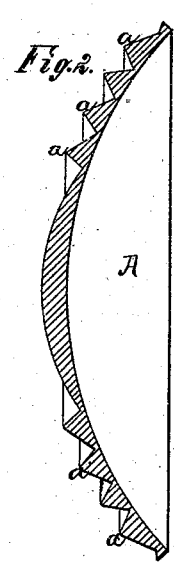
Figure 1:
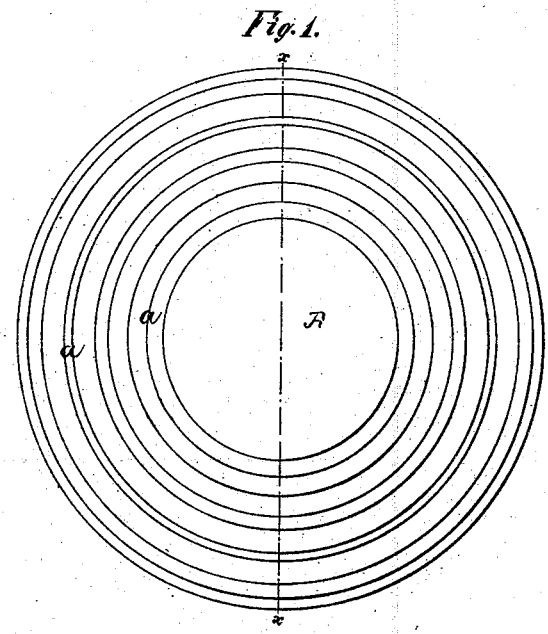
Figure 3:
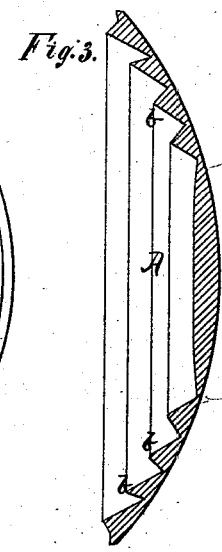

Figure 1 is a front elevation of a lens embodying my invention, which is in the form of a segment of a sphere. Figs. 2 and 3 are vertical central sectional views of the same, showing the lens, respectively, with the concentric corrugations upon the outer and inner face.

In fabricating my invention, I employ a solid piece of glass, which I mold, grind, or otherwise shape into a concavo-convex form, giving it the general configuration of a segment of a sphere or a segment of a spheroid, as shown, respectively, at A and A′ in the drawings. Upon either the convex or concave faces of these said lenses A and A′ I form, by means of suitable molds or by grinding-tools, or in any other suitable manner, a series of concentric corrugations, or alternate elevations and depressions, as shown plainly at *a b* and *a′ b′*, respectively, in Figs. 2 and 3, and Figs. 5 and 6; or, when it is so desired, both the convex and concave faces of said lenses are given a series of said concentric corrugations.

By means of my lenses A or A′, concavo-convex in form, and the segment of either a sphere or a spheroid, and having upon either or both of its faces a series of concentric corrugations, I am enabled to produce a refracting-surface for illumination, and to secure a projection of a portion of the rays to a long distance, attended with a sufficient dispersion of other rays to render the light easily visible over a larger near field, and at also a greater distance than in lenses as ordinarily constructed.

By employing the form described I obtain a lens which, from its concave shape internally, does not come so near the illuminating-flame as those of hollow, cylindric, or prismatic form heretofore used, and thus measurably avoid the heating of the central part of the lens, and also, by reason of the curvature in all directions, introduce an element of elasticity not found in prismatic, cylindric, or plano-convex lenses.

My lenses, it is evident, are, therefore, specially adapted to be employed in all cases where a semaphore-lens is required, and for use in all signal-lanterns upon light-houses, and in all railway-lights, including the head-lights of locomotives.

What I claim as my invention, and desire to secure by Letters Patent, is—

A semaphore-lens of meniscal form, having one surface a portion of sphere or spheroid, and the other composed of zones of a parabolic or hyperbolic form, with two surfaces—one adapted to project a portion of the rays to a long distance, and another, at the same time, by dispersing another portion of the rays, to illuminate a field near the lens, substantially as set forth.

CHARLES FREDERIC HOUGHTON.

Witnesses:
ELLSWORTH D. MILLS,
EDWIN C. ENGLISH.